Patented Mar. 22, 1949

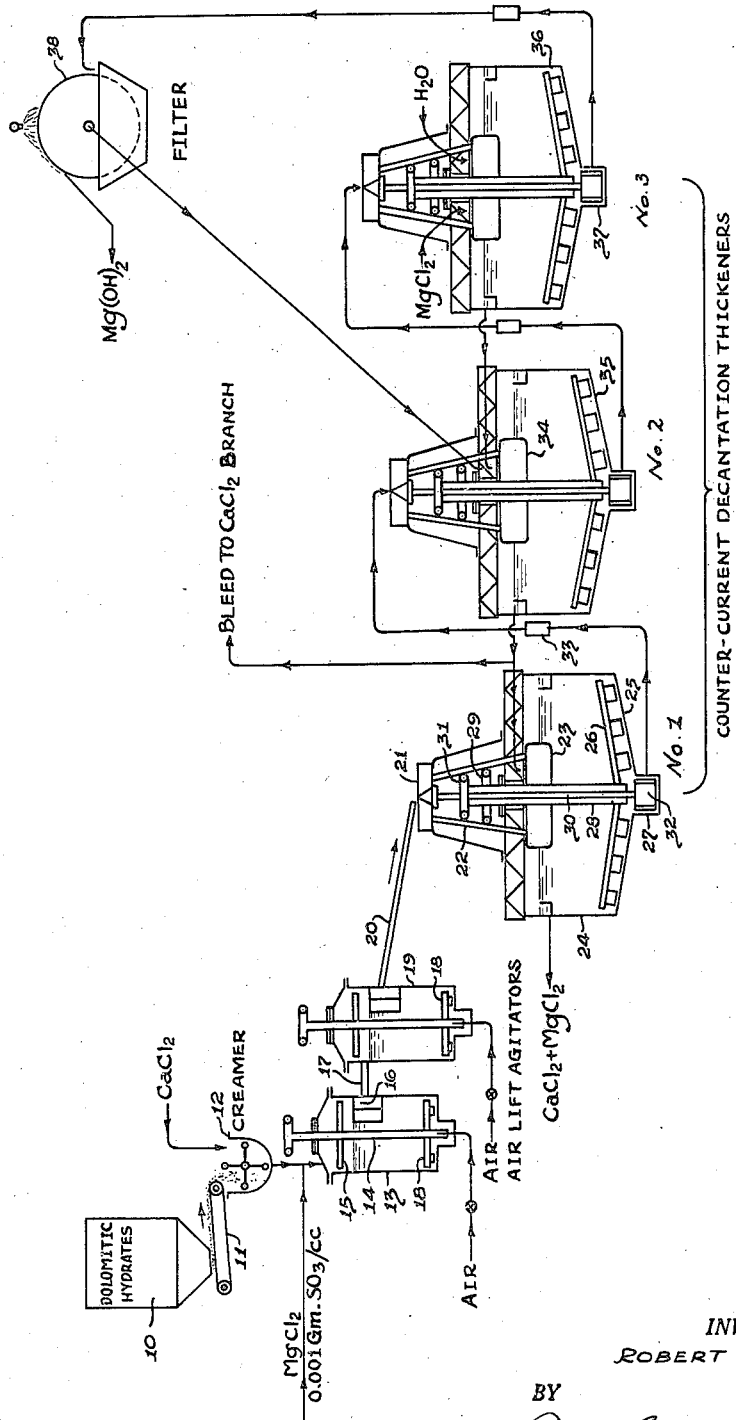

2,465,264

UNITED STATES PATENT OFFICE 2,465,264

PRODUCTION OF MAGNESIA

Robert D. Pike, Pittsburgh, Pa., assignor to Harbison-Walker Refractories Company, Pittsburgh, Pa., a corporation of Pennsylvania Application November 22, 1944, Serial No. 564,628

7 Claims. (Cl. 23—201)

This invention relates to the purification of magnesium hydrate produced by reaction of calcium hydrate and magnesium chloride, and to thickening apparatus generally useful in connection therewith and for treating other materials.

The reaction of hydrated lime, or calcium hydroxide, [$Ca(OH)_2$] with magnesium chloride ($MgCl_2$) brine to produce solid hydrated magnesia [$Mg(OH)_2$] and a calcium chloride ($CaCl_2$) brine is well known. In the practice of the present invention the calcium hydrate may be obtained by the hydration of calcined limestone. However, the present invention is applicable particularly to the production of magnesia from dolomite ($CaCO_3.MgCO_3$), especially by the processes disclosed and claimed in my copending applications Serial No. 402,935, filed July 18, 1941, now Patent No. 2,373,911, dated April 17, 1945, and Serial No. 504,128, filed September 28, 1943, now Patent No. 2,373,913, dated April 17, 1945, and it may therefore be described with particular reference thereto, by way of illustration but not of limitation.

In accordance with the process of Patent No. 2,373,911 dolomite is calcined to convert the calcium and magnesium carbonates to oxides, and the calcined material is dry hydrated to produce a large proportion of granular hydrates. Most suitably this is accomplished with a calcium chloride brine of about 1.05 to 1.08 specific gravity that is free, or substantially free, from magnesium chloride, as by mixing the calcined dolomite with about 38 to 40 per cent by weight of such a brine. Advantageously the hydrated material is aged for a period of time after which it is classified to separate it into a granular fraction and a fines fraction.

The word "granular" as thus used refers to particles larger than about 325 mesh, most suitably larger than about 200 mesh, and not appreciably greater than 65 mesh. There may, of course, be some overlapping of particle sizes of the granular and the fines fractions but in every case the particles of the fines fraction average finer than those of the granular fraction and the average will pass a mesh substantially finer than that retaining the average of the granular fraction. The granular material goes to a magnesia branch of the process, and the fines go to a carbonate branch.

The granular fraction is then creamed, in the magnesia branch of the process, with a further amount of the calcium chloride brine referred to with production of a lump-free flowable cream which is reacted, preferably promptly, with a magnesium chloride brine to convert the hydrated lime of the dolomite to hydrated magnesia. In this latter step it is important to supply the magnesium chloride in an amount by weight not less than about 100 or 105 per cent of the amount stoichiometrically necessary, and as much as 140 per cent excess may be used. The resultant slurry of magnesia in a calcium chloride brine containing the excess magnesium chloride is then settled, suitably in a countercurrent decantation (C. C. D.) system. The underflow from the last of these thickeners is then filtered to produce a cake of hydrated magnesia which is treated as desired, for example by calcining it to produce synthetic dead burned magnesia (MgO).

The magnesium chloride brine used in the foregoing reaction is regenerated in the carbonate branch of the process by reacting the fines fraction of the hydrated dolomite with the brine overflow from the C. C. D. thickeners and with carbon dioxide to produce calcium carbonate ($CaCO_3$) and regenerate magnesium chloride brine containing a small amount of calcium chloride. In the carbonate branch of the process of Patent No. 2,373,911 the hydrated dolomite fines are first subjected to a precarbonating reaction with sufficient of the calcium chloride brine from the aforementioned C. C. D. system to convert all of the hydrated lime in the fines to calcium chloride so that the material passing to the carbonator comprises a suspension of hydrated magnesia in a calcium chloride brine containing a small amount of magnesium chloride but substantially no hydrated lime. This slurry is then treated with carbon dioxide to produce calcium carbonate which is subsequently removed, as by thickening and subsequent filtration, and the $MgCl_2$ brine recovered is returned to the magnesia branch. Most suitably this latter brine is evaporated, and made up with magnesium chloride as need be, so that as supplied to the magnesia branch it has a specific gravity of about 1.10 to 1.14 and contains about 11 per cent of magnesium chloride and 3 per cent of calcium chloride.

In this manner I am able to produce a hydrated magnesia that settles quickly and filters freely, both much more so than magnesia produced in accordance with prior art proposals. Although the principal reactions have been well known for many years, magnesia as produced in accordance with prior art proposals settled slowly and was very difficult to filter and wash, due primarily to the tendency of the magnesia to be dispersed in very finely divided form. By observation of the factors set forth above, the process described results in reducing dispersion of the hydrated magnesia and the product is in a form that settles rapidly and filters freely.

The process of my aforesaid application Patent No. 2,373,913 is generally similar but is predicated largely upon my discovery that dispersion of the hydrated magnesia can be suppressed still further by providing the magnesium chloride brine used in the magnesia branch with $SO_3$ in solution within certain limitations. The sulfate is preferably present as gypsum, or calcium sulfate ($CaSO_4$). The brine should contain sulfate equivalent to about 0.0015 to 0.0025 gram of $SO_3$ per cc. of brine, which is equivalent to about 0.134 to 0.222 per cent of $SO_3$. In a typical operation the calcium chloride brine leaving the magnesia branch will contain about 0.0014 to 0.0017 gram of $SO_3$ per cc. By aging this brine, gypsum will be spontaneously precipitated so that the brine passing to the carbonate branch will contain only about 0.0006 to 0.001 gram per cc. This is advantageous because the characteristics of the calcium carbonate produced are better than where the brine is fed directly from the magnesia branch to the carbonate branch. Typically, the magnesium chloride brine regenerated in the carbonate branch will contain about 0.000065 to 0.00014 gram of $SO_3$ per cc., and gypsum or other appropriate sulfate may be added to it on its way to the magnesia branch to bring the sulfate content within the range just stated.

In the practice of the process of my aforementioned patent the magnesium hydrate produced may contain as much as 3 per cent of lime (CaO) on the calcined basis. This is satisfactory for many purposes, as for the production of refractories. It would be desirable for some purposes, however, to produce consistently magnesia containing as little as 2 per cent, or even not over about 1 per cent, of lime, while retaining the form of the magnesium hydrate that characterizes the two foregoing processes and results in highly satisfactory and commercially economical rates of settling and filtration.

In practicing the inventions of my aforesaid patents it has been found that the hydrated magnesia actually settles so rapidly that it can not be handled satisfactorily in conventional forms of thickeners used for countercurrent decantation washing.

Thus, the usual type of thickener comprises a sedimentation tank the bottom of which is provided centrally with a discharge cone into which the thickened product passes and from which it is withdrawn by a pump. Experience with my process has shown that the greater part of the magnesium hydrate settles so rapidly into the discharge cone of the first thickener of the series that it packs and tends to stop up the off-take to the pump, and this is so despite the fact that it is customary to provide a scraper in the cone that moves with the rakes which rotate in the sedimentation tank and move the thickened material toward and into the discharge cone. As the particle size of the magnesium hydrate is not substantially reduced in passing through the series of thickeners, the same thing occurs in each succeeding thickener. The consequence is that with known types of thickeners the C. C. D. system quickly becomes stopped up and inoperative.

A major object of the present invention is to provide a process of producing high purity hydrated magnesia by reaction of calcium hydrate and magnesium chloride that is simple, is effective to reduce the lime content of the magnesia to not over about 2 per cent, and as little as 1 per cent, on the calcined basis, and which is particularly effective when applied to the processes of my above-mentioned applications.

A further object is to supply such a process in which the reactions between calcium hydrate and magnesium chloride is continued in the thickeners so that even the largest and most stable particles of the creamed hydrated dolomite are substantially completely reacted.

Yet another object is to provide a process of the type mentioned in which the magnesium hydrate is brought into contact with a further amount of magnesium chloride to effect preferential adsorption of magnesium chloride with displacement of adsorbed calcium chloride, whereby to reduce the lime content of the final magnesia product.

Still another object is to provide a thickener that is adapted for use with slurries and the like that contain rapidly settling solids, the discharge well of which does not become clogged, and which is of simple, sturdy and relatively inexpensive construction.

The invention will be described with reference to the accompanying drawing which is a schematic representation illustrative of the preferred embodiment of the process provided by the invention and which illustrates in sufficient detail thickeners in accordance with the invention.

The lime content of magnesia as produced in accordance with my above-described processes arises from two sources. First, to avoid dispersion of the granular hydrated magnesia it is desirable to restrict the time during which the precipitated magnesia is in contact with brine. Consequently some of the larger particles of the granular dolomitic hydrates may escape complete reaction and will therefore appear as such in the magnesia. Second, calcium chloride may be adsorbed from the brine by the granular magnesium hydrate; it is difficult, if not impossible, to remove such adsorbed chloride completely by washing of the magnesia filter cake, and this chloride is converted to calcium oxide upon calcining of the magnesium hydrate.

I have discovered, and it is upon this that the present invention is predicated in part, that by subjecting the precipitated magnesium hydrate to longer contact with dilute brines containing magnesium chloride it is possible to convert unreacted lime to calcium chloride, with production of an equivalent amount of hydrated magnesia, and simultaneously to effect desorption of calcium chloride from the magnesium hydrate by preferential adsorption of magnesium chloride from the dilute brine. Thereby I am able to produce magnesia containing, on the calcined basis, not over about 2 per cent of lime as CaO, and even as little as 1 per cent. Most suitably I accomplish this by passing the slurry of magnesium hydrate in calcium chloride brine into the first of a countercurrent decantation series of washing thickeners to remove the greater part of the brine, replacing it mainly with water and partly with a brine containing magnesium chloride in greater concentration relative to calcium chloride than the brine with which the magnesium hydrate would be associated if water alone were used for washing.

The invention may be described with further reference to the accompanying drawing which represents the process as applied, by way of illustration, to the production of hydrated magnesia from dolomite. The dolomite is preferably calcined, hydrated, and classified into granular and fines fractions in accordance with my aforesaid patents. The granular dolomitic hydrates are stored in a bin 10 which feeds a continuous conveyor 11 that delivers the granular hydrates to a creamer 12 where they are mixed with a calcium chloride brine, most suitably substantially free from magnesium chloride, to produce a thick and lump-free slurry. This slurry passes in a continuous stream of the first of two reactors which preferably take the form of air-lift agitators. It is preferred to use two of these in series to minimize short circuiting of unreacted particles. In the first agitator 13 the creamed slurry meets an incoming stream of magnesium chloride brine, for example, a brine of the composition and concentration disclosed in Patent No. 2,373,911 and preferably containing dissolved sulfate as disclosed in Patent No. 2,373,913. The creamed slurry and brine are fed suitably in such proportions that there is formed in the agitator 13 a thin slurry containing about 6 per cent solids which is lifted by air pressure through the central hollow rotating shaft 14 and is distributed through the rotating arms 15 carried by shaft 14. At each rotation a certain proportion, say 15 to 20 per cent of the total flow induced by the air-lift, is dropped into a discharge pocket 16 from which it passes through a connecting pipe 17 into the second air-lift agitator 19 where the same action is repeated. Rakes 18 carried by the rotating shafts 14 move the settled granular material in the agitators 13 and 19 to the sump portions at their bottoms for being lifted by the air stream. From the discharge pocket of agitator 19 the reacted slurry of magnesium hydrate flows to a countercurrent decantation thickening and washing system shown in this instance as comprising three thickeners.

The thin slurry is fed by pipe 20 to the first, or No. 1, thickener where it enters a distributor 21, suitably by impinging against a centrally positioned cone, as shown, for uniform distribution. The slurry passes by gravity from 21 through a series of pipes 22 which deliver it into a feed well 23 disposed centrally of the sedimentation tank 24 which, as usual, has a sloping bottom 25 and is provided with rotatable rakes 26.

In conventional thickener design the collecting sump is ordinarily an inverted frustrum of a cone with the pump attached to the lower end, and the material which settles into the cone is stirred by means attached to the rake arms so that this stirrer necessarily operates very slowly. Such conventional thickeners do not provide sufficient agitation in the sump to keep the magnesium hydrate, or other rapidly settling or cementitious material, in a fluid condition with the result that the sump becomes stopped up.

In accordance with the present invention I provide a sump 27 that is preferably cylindrical and is of greater volume than has been customary, and I provide it with an independently driven agitator, or stirrer, that can be actuated at sufficient speed to keep the granular settled material in suspension and in a sufficiently fluid condition that it does not clog the sump outlet. To this end rakes 26 are driven in the embodiment shown by a hollow shaft 28 through a gear or pulley 29 at the very slow speed that is conventional in the art and necessary in a thickener. Through shaft 28 there extends an inner shaft 30 which is driven through a second gear or pulley 31 and which carries at its lower end a stirrer 32 disposed in sump 27. Stirrer 32 is operated at a rate which is always greater than that of the rakes 26 to keep the thickened slurry in the sump 27 continuously in a fluid condition which prevents caking and cementing of the hydrates.

In producing hydrated magnesia by this procedure I prefer to retain the thickened slurry in the sump of the first thickener for from 1 to 3 minutes and to operate the stirrer at a peripheral velocity of the blade tips of from 10 to 30 ft. per minute. Under these conditions of detention and agitation the reaction between the magnesium chloride of the brine and any unreacted lime present is continued without material breaking down and dispersion of the granular particles of magnesium hydrate; and the magnesium hydrate undergoes a marked preferential adsorption of magnesium chloride in place of calcium chloride, provided the ratio of calcium chloride to magnesium chloride is not over about 2 or 3 to 1.

The thickened material is removed from sump 27 by a pump 33 and delivered through feed well 34 into the second, or No. 2, thickener 35, the construction of which is the same as described in connection with the first thickener. The underflow from this thickener is delivered to the third, or No. 3, thickener 36, which likewise is constructed the same as the first two thickeners. The underflow from thickener 36 is passed by a pump from sump 37 to a rotary filter 38 where the cake is washed with water and subsequently removed for final treatment.

The combined filtrate and wash water from filter 38 are passed to the feed well 34 of the No. 2 thickener. The overflow from the No. 3 thickener likewise is passed to the No. 2 thickener and, similarly, the overflow from the No. 2 thickener goes to the feed well of the No. 1 thickener.

In ordinary countercurrent decantation practice water alone is added to the feed well of the No. 3 thickener. In accordance with the present invention, however, I find that by substituting for about 15 per cent of this water a magnesium chloride brine, suitably the same as that supplied to the air-lift agitators, I can reduce the lime content of the magnesium hydrate to the very low limit that is characteristic of this invention. This I attribute to reaction between magnesium chloride and unreacted lime in the thickener sumps, and also to the fact that by lowering the ratio of calcium chloride to magnesium chloride in the No. 3 thickener to a very low value by introducing some magnesium chloride brine, $MgCl_2$ is adsorbed by the magnesium hydrate particles in preference to $CaCl_2$. The quantity of unreacted lime is small and likewise the concentration of magnesium chloride but the conditions provided are just those which I have found to be necessary to remove most of the unreacted lime and adsorbed calcium chloride.

I have described mixing about 85 per cent of the wash water which would ordinarily be fed to the No. 3 thickener with about 15 per cent of the same quantity of magnesium chloride brine containing about 11 per cent of magnesium chloride and 3 per cent of calcium chloride, and of about 1.12 specific gravity. The specific gravity of this mixture is about 1.02. The same specific gravity may be had by using an appropriately larger amount of wash water from the carbonate filter in the carbonate branch of my above-identified applications.

The following data are representative of the invention as applied to the production of 100 tons per day of magnesia from dolomite of the Niagara formation of Northwest Ohio:

| Item | Quantity | Unit |
|---|---|---|
| Granular hydrated dolomite | 222 | lbs./minute. |
| Magnesium hydrate from #3 thickener | 218 | Do. |
| Calcium chloride brine to cream s. g. 1.065. | 41.4 | G. P. M. |
| $MgCl_2$ brine, 11% $MgCl_2$, 3% $CaCl_2$, s. g. 1.118 to #1 agitator. | 338 | Do. |
| Underflow of #3 thickener average | 86 | Do. |
| Wash water to #3 thickener | 99 | Do. |
| Magnesium chloride brine to #3 thickener. | 20 | Do. |
| Wash water to rotary drum filter | 22 | Do. |
| Overflow #1 thickener | 420 | Do. |
| S. g. overflow of #1 thickener | 1.093 | |
| $MgCl_2$ | 47 | gm./liter. |
| $CaCl_2$ | 81.8 | Do. |
| $\frac{CaCl_2}{MgCl_2}$ | 1.74 | Ratio. |
| S. g. overflow #2 thickener | 1.046 | |
| $MgCl_2$ | 17.7 | gm./liter. |
| $CaCl_2$ | 47.5 | Do. |
| $\frac{CaCl_2}{MgCl_2}$ | 2.7 | Ratio. |
| Bleed to $CaCl_2$ branch | 75 | G. P. M. |
| S. G. overflow #3 thickener | 1.027 | |
| $MgCl_2$ | 13.7 | gm./liter. |
| $CaCl_2$ | 27.5 | Do. |
| $\frac{CaCl_2}{MgCl_2}$ | 2.0 | Ratio. |
| $Cl_2$ content as chloride of the magnesium hydrate, calcined basis. | 2.39 | Percent. |

The magnesia produced in that test when completely calcined had a content of about 1.5 per cent of lime. The filtering rate, in terms of the calcined product, was about 90 pounds per sq. foot of filter area per 24 hours.

By operating in the same manner but omitting the addition of magnesium chloride to the No. 3 thickener, using granular dolomitic hydrates of maximum stability prepared in accordance with Patent No. 2,373,913, the ratio of calcium chloride to magnesium chloride in the No. 3 thickener was increased to 7.35, and the magnesium hydrate upon calcination contained about 3 per cent of lime and about 2 per cent of chlorine as chlorides. If all of the chlorine were present as calcium chloride, this would correspond to about 1.55 per cent equivalent CaO, leaving about 1.5 per cent actual unreacted lime. As the addition of magnesium chloride to the No. 3 thickener in accordance with this invention reduces the lime content to about 1.5 per cent, its effect was apparently to remove part of the unreacted lime and part of the adsorbed calcium chloride.

For the production of 100 tons of magnesia per day from the Niagara formation dolomite I prefer to use Dorr air-lift agitators, using two in series as shown, each being about 16 feet in diameter with an air-lift of about 8 to 9 feet high. However, three or more agitators may be used. The No. 1 thickener constructed as described and shown may have a diameter of about 88 feet, while the No. 2 and No. 3 thickeners may have a diameter of about 56 feet. All of the thickeners are suitably 8 feet deep.

Various modifications are, of course, permissible. For example, the pipes 22 may be adjusted radially by appropriate means to cause more or less of the solid material to drop into the central sump 27 or onto the sloping bottom 25.

It will be understood that the new type of thickener described herein, and which forms a part of the invention, is not restricted to the treatment of magnesia slurries but is of general utility where thickening is necessary, especially with rapidly settling cementitious solids.

The calcium chloride supplied to creamer 12 may be derived from any suitable source but in a cyclic process of producing magnesia from dolomite I prefer to form it in a separate branch of the process as described in Patent No. 2,373,911. Preferably, a portion of the overflow from the No. 2 thickener is bled to a reactor where it meets a portion of the fines from the dolomitic hydrates classification, the two being reacted in amounts such as to convert all of the magnesium chloride in the brine to hydrated magnesia and produce a brine of calcium chloride substantially free from magnesium chloride. The product is subjected to a thickening operation. The underflow from the thickener may be fed to the carbonate branch, as to the precarbonating step, and the overflow is passed to creamer 12 and to the hydrator of my aforesaid copending application.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. That method of producing high purity hydrated magnesia which comprises treating hydrated lime with magnesium chloride brine in an amount supplying a large excess of magnesium chloride over the requirement of the reaction and thereby producing a slurry of hydrated magnesia containing unreacted lime and carrying adsorbed calcium chloride, subjecting said slurry to countercurrent decantation washing in a series of thickeners, introducing into the last of said thickeners an aqueous solution of magnesium chloride in an amount small relative to that used for treating said lime and such that the ratio of calcium chloride to magnesium chloride is low, and thereby causing the hydrated magnesia to preferentially adsorb magnesium chloride with reduction of its lime content, and recovering the lime-impoverished magnesium hydrate.

2. A method according to claim 1, said hydrated lime being supplied as granular dolomitic hydrates, and the ratio $CaCl_2:MgCl_2$ in the last washing is not over about 3:1.

3. A method according to claim 1 in which the ratio of $CaCl_2:MgCl_2$ in said thickeners is not over about 3:1.

4. A method according to claim 1 in which desorption of $CaCl_2$ and reaction of residual $Ca(OH)_2$ is assisted in said thickeners by subjecting the slurry in the thickener sumps to gentle agitation at a rate greater than the rate of agitation in the sedimentation portion of the thickeners.

5. That method of producing high purity hydrated magnesia which comprises treating lime with an aqueous solution containing magnesium chloride to supply a large excess of magnesium chloride over the requirement of the reaction and thereby producing a relatively dilute slurry of magnesium hydrate, settling and recovering a thickened slurry of said magnesium hydrate, and washing the thickened slurry with a dilute aqueous solution of magnesium chloride to supply magnesium chloride in an amount that is small relative to that used for treating said lime and thereby reducing the lime content of the magnesium hydrate.

6. That method of producing high purity hydrated magnesia which comprises treating lime with an amount of an aqueous solution of magnesium chloride to supply a large excess of magnesium chloride over the requirement of the reaction and thereby producing a relatively dilute slurry of magnesium hydrate, and subsequently and separately treating said magnesium hydrate with a dilute aqueous solution of magnesium chloride supplying a relatively small amount of magnesium chloride and thereby reducing the lime content of the magnesium hydrate.

7. A method according to claim 6 in which said lime is treated with said solution of magnesium chloride to supply not less than 100 per cent excess magnesium chloride over the requirement of the reaction.

ROBERT D. PIKE.

REFERENCES CITED

The following references are of record in the file of this patent:

UNITED STATES PATENTS

| Number | Name | Date |
| --- | --- | --- |
| 867,958 | Dorr | Oct. 15, 1907 |
| 1,739,302 | Gregorich | Dec. 10, 1929 |
| 2,124,002 | Mastin | July 19, 1938 |
| 2,224,780 | Chesny | Dec. 10, 1940 |
| 2,227,534 | Collins | Jan. 7, 1941 |
| 2,233,619 | Linch | Mar. 4, 1941 |
| 2,233,641 | Ramsey | Mar. 4, 1941 |
| 2,255,422 | Heath et al. | Sept. 9, 1941 |
| 2,276,245 | Clarke | Mar. 10, 1942 |

OTHER REFERENCES

Treadwell and Hall: Analytical Chemistry, vol. I, pp. 46–49, MacMillan Company, New York, 1929.